(12) United States Patent
Gupta et al.

(10) Patent No.: US 11,037,559 B2
(45) Date of Patent: Jun. 15, 2021

(54) VOICE GATEWAY FOR FEDERATED VOICE SERVICES

(71) Applicant: AT&T Intellectual Property I, L.P., Atlanta, GA (US)

(72) Inventors: Varun Gupta, Morristown, NJ (US); John Murray, Denville, NJ (US); Kaustubh Joshi, Scotch Plains, NJ (US); Mazin Gilbert, Warren, NJ (US); Oliver Spatscheck, Randolph, NJ (US); Rittwik Jana, Montville, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 113 days.

(21) Appl. No.: 16/234,343

(22) Filed: Dec. 27, 2018

(65) Prior Publication Data
US 2020/0211541 A1 Jul. 2, 2020

(51) Int. Cl.
*G10L 15/32* (2013.01)
*G10L 15/22* (2006.01)
*G10L 15/18* (2013.01)
*G10L 15/30* (2013.01)
*G10L 15/08* (2006.01)

(52) U.S. Cl.
CPC .......... *G10L 15/22* (2013.01); *G10L 15/1815* (2013.01); *G10L 15/30* (2013.01); *G10L 15/1822* (2013.01); *G10L 15/32* (2013.01); *G10L 2015/088* (2013.01); *G10L 2015/223* (2013.01)

(58) Field of Classification Search
CPC ...... G10L 15/32; G10L 15/30; G10L 15/1822
See application file for complete search history.

(56) References Cited

U.S. PATENT DOCUMENTS

| | | | | |
|---|---|---|---|---|
| 5,977,964 A | * | 11/1999 | Williams | H04N 7/10 715/721 |
| 8,606,581 B1 | * | 12/2013 | Quast | G10L 15/32 704/254 |
| 9,172,747 B2 | | 10/2015 | Walters et al. | |
| 9,349,099 B2 | * | 5/2016 | Pinckney | G06N 5/04 |
| 9,729,592 B2 | | 8/2017 | Slayton et al. | |
| 10,096,316 B2 | | 10/2018 | Kalns et al. | |
| 10,133,612 B2 | | 11/2018 | Wood et al. | |
| 10,204,627 B2 | | 2/2019 | Nitz et al. | |

(Continued)

FOREIGN PATENT DOCUMENTS

EP 1045373 A3 * 4/2001 ......... G10L 15/1822

*Primary Examiner* — Feng-Tzer Tzeng (57) ABSTRACT

Devices, computer-readable media, and methods for submitting a modified voice input to a service based upon a user intent determined from a voice input in accordance with a voice interface of the service are disclosed. A processing system including at least one processor may obtain a voice input of a user, determine an intent from the voice input, identify a first service, from among a plurality of services, in accordance with the intent, and formulate a first modified voice input from the voice input in accordance with a voice interface of the first service, where each of the services is associated with one of a plurality of different voice interfaces. The processing system may further submit the first modified voice input to the first service, obtain a first voice response from the first service, and present a voice output to the user in accordance with the first voice response.

20 Claims, 3 Drawing Sheets

(56) References Cited

U.S. PATENT DOCUMENTS

| | | |
|---|---|---|
| 2013/0060571 A1* | 3/2013 | Soemo .................... G06F 3/011 |
| | | 704/251 |
| 2013/0204813 A1 | 8/2013 | Master et al. |
| 2014/0310002 A1 | 10/2014 | Nitz et al. |
| 2016/0098992 A1 | 4/2016 | Renard et al. |
| 2018/0061420 A1 | 3/2018 | Patil et al. |
| 2018/0204569 A1 | 7/2018 | Nadkar et al. |
| 2018/0261223 A1 | 9/2018 | Jain et al. |
| 2018/0293484 A1 | 10/2018 | Wang et al. |
| 2018/0336048 A1 | 11/2018 | Zarlengo et al. |

* cited by examiner

VOICE GATEWAY FOR FEDERATED VOICE SERVICES

The present disclosure relates to voice assistants, and more particularly to methods, non-transitory computer-readable media, and devices for submitting a modified voice input to a service based upon a user intent determined from a voice input in accordance with a voice interface of the service.

BACKGROUND

Commercially available voice assistants may have different strengths and capabilities. These platforms may also have different languages of interaction.

SUMMARY

Devices, computer-readable media, and methods for submitting a modified voice input to a service based upon a user intent determined from a voice input in accordance with a voice interface of the service are disclosed. For example, a processing system including at least one processor may obtain a voice input of a user, determine an intent from the voice input, identify a first service, from among a plurality of services, in accordance with the intent, and formulate a first modified voice input from the voice input in accordance with a voice interface of the first service, where each of the plurality of services is associated with one of a plurality of different voice interfaces. The processing system may further submit the first modified voice input to the first service, obtain a first voice response from the first service, and present a voice output to the user in accordance with the first voice response.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Devices, computer-readable media, and methods for submitting a modified voice input to a service based upon a user intent determined from a voice input in accordance with a voice interface of the service are disclosed. For instance, there has been a proliferation of commercially available voice assistants with different strengths and capabilities. For example, a first voice assistant may be more suitable for shopping while a second voice assistant may be more effective for turn-by-turn navigation. In addition, users of voice assistants may have content preferences that may not be supported by a single voice assistant. In accordance with the present disclosure, a user may also be interested in aggregating results from several voice assistants. For instance, in one example, comparison shopping may include submitting queries to two or more voice assistants. Although voice-based interactions with computing systems are becoming increasingly prevalent, each voice assistant may have a unique language of interaction.

The present disclosure features an intelligent gateway (e.g., a "voice gateway") that interfaces with a variety of voice assistants. In one example, the voice gateway may be hosted by a network service provider which may also integrate user context information derived from the network, such as location information, time of day, customer category, biometric information, and so forth. The voice gateway may also use the customer's preferences as well as historical data on voice calls, text messages, purchases, etc., to provide a more personalized experience.

In one example, the voice gateway of the present disclosure may be deployed in a telecommunication network edge cloud infrastructure and may operate as follows. First, the voice gateway may receive voice input of a user e.g., via a cellular access network or the like from a user device. The voice gateway may then perform speech-to-text translation and text processing (e.g., via a natural language understanding (NLU) pipeline or "engine," which may also be referred to more generally as a natural language processing (NLP) pipeline or engine) to derive the intent of the user, select at least one destination service (e.g., at least one voice assistant) to submit a request based upon the intent, and route the request to such voice assistant(s). In one example, the request submitted to each destination service may comprise a modified version of the voice input, e.g., modified to conform to a voice interface syntax of the destination service. The voice gateway may receive a response from the at least one destination service, may further process the at least one response (e.g., comparing, aggregating, etc., if the request is submitted to more than one destination service and more than one response is received), and may present a final result to the user. The voice gateway may maintain per-user state and historical user preferences to present the appropriate results to users. The voice gateway may also leverage fine-grained user location information available through the network service provider's network for more precise operations. For example, when the user is near a physical location (such as a store) associated with an available service, then submissions of requests to that service may be prioritized, the result(s) from that service may be prioritized, and so forth.

The present disclosure therefore applies natural language processing (NLP) and deep learning to provide for seamless communications with a wide array of services (e.g., voice assistants), each with its own application programming interfaces (APIs) (e.g., unique voice interface syntaxes) and capabilities. The present disclosure also accounts for the development of a wide variety of network services, such as voice-enabled interactive portals made available by businesses or other information service providers to customers, e.g., a "voice site" analogous to a primarily visual and/or text-based web page. The voice gateway of the present disclosure may evaluate and utilize any of such "voice sites" (each of which may also be referred to as a "service" or "voice assistant") and provide responses to user queries from any subset of these backend voice sites. These and other aspects of the present disclosure are discussed in greater detail below in connection with the examples of FIGS. 1-3.

Figure 1:
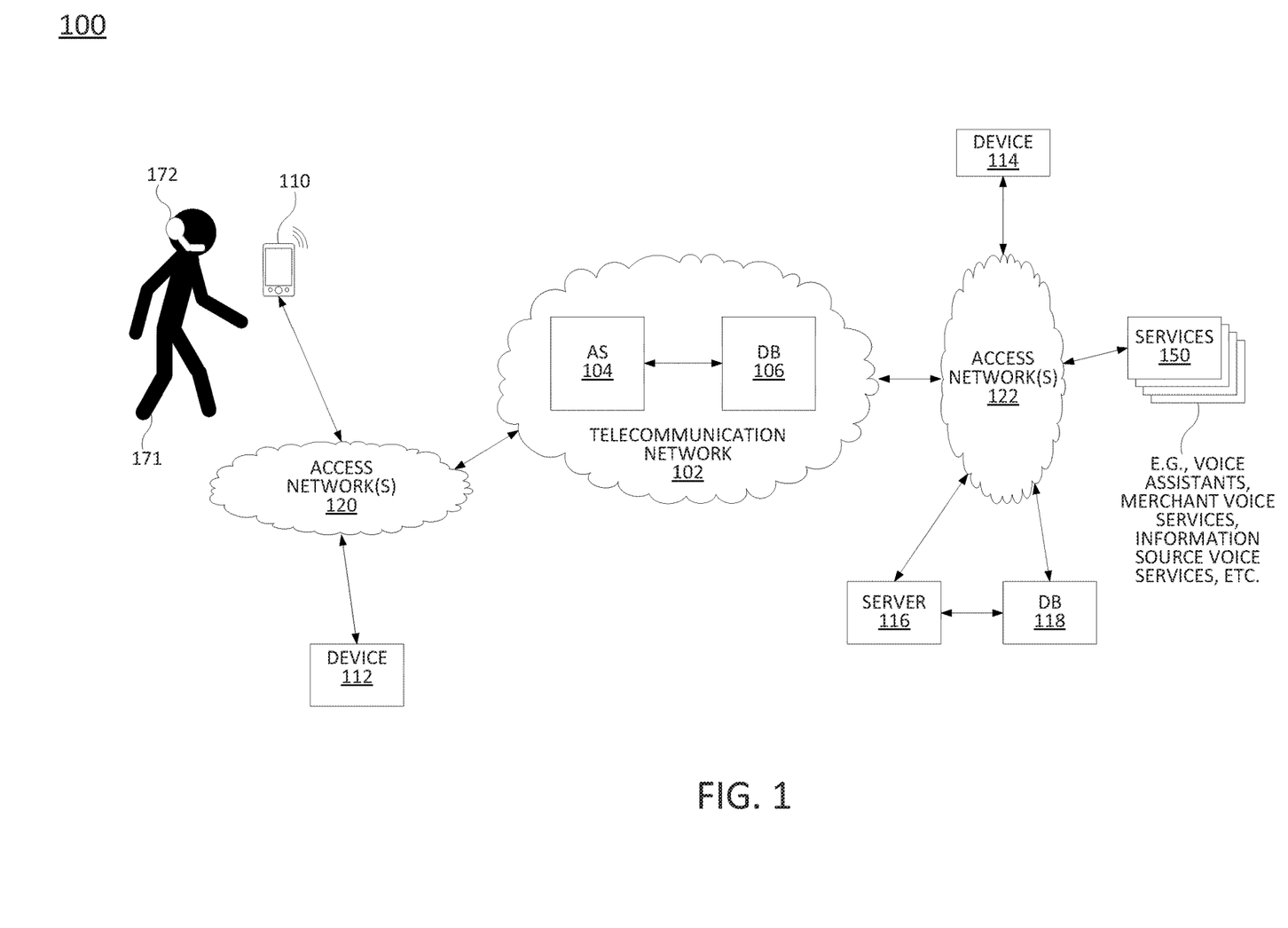
FIG. 1 illustrates an example network or system related to the present disclosure.

To further aid in understanding the present disclosure, FIG. 1 illustrates an example system 100 in which examples of the present disclosure for submitting a modified voice input to a service based upon a user intent determined from a voice input in accordance with a voice interface of the service may operate. The system 100 may include any one or more types of communication networks, such as a traditional circuit switched network (e.g., a public switched telephone network (PSTN)) or a packet network such as an Internet Protocol (IP) network (e.g., an IP Multimedia Subsystem (IMS) network), an asynchronous transfer mode (ATM) network, a wireless network, a cellular network (e.g., 2G, 3G, 4G, 5G and the like), a long term evolution (LTE) network, and the like, related to the current disclosure. It should be noted that an IP network is broadly defined as a network that uses Internet Protocol to exchange data packets. Additional example IP networks include Voice over IP (VoIP) networks, Service over IP (SoIP) networks, and the like.

In one example, the system 100 may comprise a telecommunication network 102. The telecommunication network 102 may be in communication with one or more access networks 120 and 122, and the Internet (not shown). In one example, telecommunication network 102 may combine core network components of a cellular network with components of a triple play service network; where triple-play services include telephone services, Internet/data services and television services to subscribers. For example, telecommunication network 102 may functionally comprise a fixed mobile convergence (FMC) network, e.g., an IP Multimedia Subsystem (IMS) network. In addition, telecommunication network 102 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. Telecommunication network 102 may further comprise a broadcast television network, e.g., a traditional cable provider network or an Internet Protocol Television (IPTV) network, as well as an Internet Service Provider (ISP) network. In one example, telecommunication network 102 may include a plurality of television (TV) servers (e.g., a broadcast server, a cable head-end), a plurality of content servers, an advertising server (AS), an interactive TV/video on demand (VoD) server, and so forth. For ease of illustration, various additional elements of network 102 are omitted from FIG. 1.

In one example, the access networks 120 and 122 may comprise Digital Subscriber Line (DSL) networks, public switched telephone network (PSTN) access networks, broadband cable access networks, Local Area Networks (LANs), wireless access networks (e.g., an Institute for Electrical and Electronics Engineers (IEEE) 802.11/Wi-Fi network and the like), cellular access networks, $3^{rd}$ party networks, and the like. For example, the operator of telecommunication network 102 may provide a cable television service, an IPTV service, or any other types of telecommunication service to subscribers via access networks 120 and 122. In one example, the access networks 120 and 122 may comprise different types of access networks, may comprise the same type of access network, or some access networks may be the same type of access network and other may be different types of access networks. In one embodiment, the telecommunication network 102 may be operated by a telecommunication network service provider. The telecommunication network 102 and the access networks 120 and 122 may be operated by different service providers, the same service provider or a combination thereof, or may be operated by entities having core businesses that are not related to telecommunications services, e.g., corporate, governmental or educational institution LANs, and the like.

In one example, the access networks 120 may be in communication with one or more devices 110 and 112. Similarly, access networks 122 may be in communication with one or more devices, e.g., device 114, server 116, database (DB 118), services 150 (e.g., a plurality of servers hosting services), and so forth. Access networks 120 and 122 may transmit and receive communications between devices 110, 112, and 114, between devices 110, 112, and 114, and server 116 and/or database (DB) 118, services 150, application server (AS) 104 and/or database (DB) 106, other components of telecommunication network 102, devices reachable via the Internet in general, and so forth. In one example, each of the devices 110, 112, and 114 may comprise any single device or combination of devices that may comprise a user endpoint device and/or customer premises equipment (CPE). For example, the devices 110, 112, and 114 may each comprise a mobile device, a cellular smart phone, a laptop, a tablet computer, a desktop computer, an application server, a bank or cluster of such devices, and the like. Alternatively, or in addition, devices 110, 112, and 114 may each comprise a home gateway, a router, or any combination thereof, and so forth. Services 150 may comprise various types of services as described herein, e.g., online services with voice interfaces (e.g., APIs with respective voice interface syntaxes), such as voice assistants, merchant or enterprise services (e.g., online retail shops, information services, etc.), and so on.

In the example of FIG. 1, device 110 may be associated with a user 171 who may be a user of a voice gateway service as described herein. In the example of FIG. 1, access networks 120 may also be in communication with a headset 172 of user 171, e.g., directly or via device 110. For instance, the headset 172 may communicate with various network connected devices via infrastructure of access networks 120 (such as base stations, wireless routers, etc.) via IEEE 802.11 based communications (e.g., "Wi-Fi"), cellular communications, etc. Alternatively, or in addition, headset 172 may be paired with device 110, e.g., via IEEE 802.11 based communications, IEEE 802.15 based communications (e.g., "Bluetooth", "ZigBee", etc.), and so forth), or via a wired connection, and may be used to interact with other network-connected devices via device 110. As just one example, user 171 may cause a voice call to be established between device 110 and device 114, and the user 171 may participate in the call via a speaker/earpiece and microphone of the headset 172.

Figure 3:
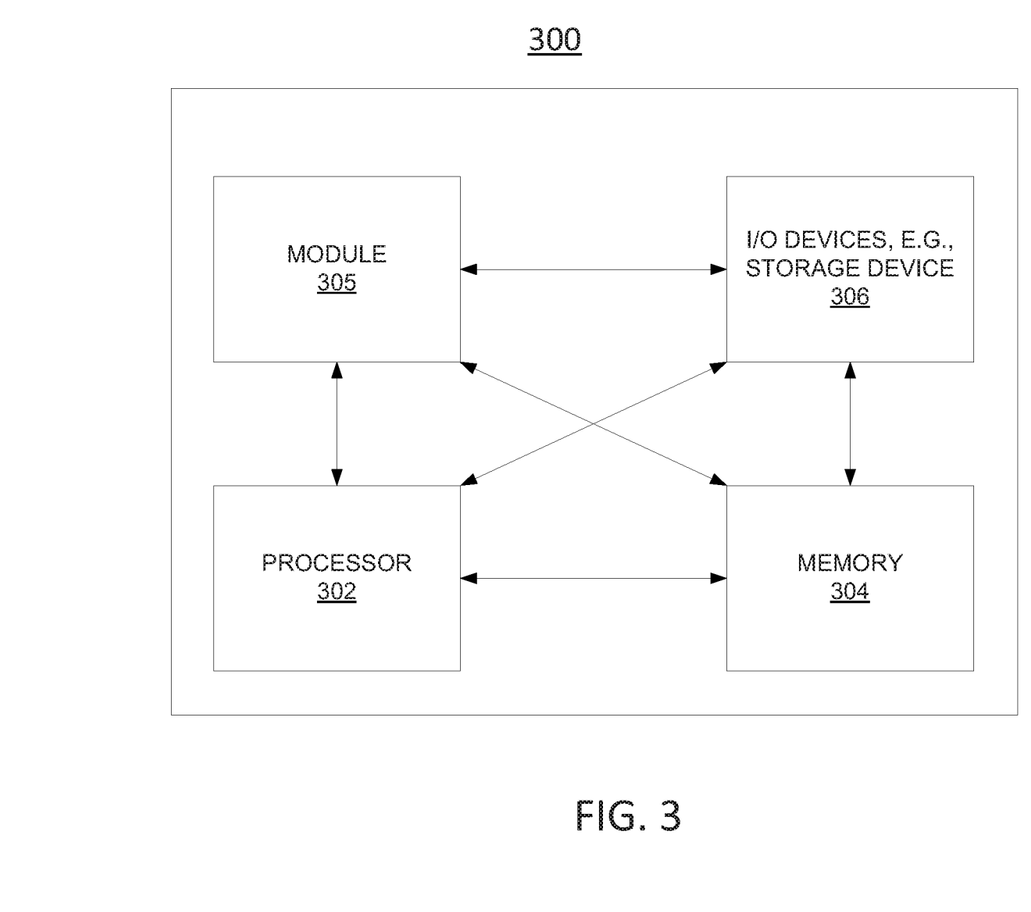
FIG. 3 illustrates a high-level block diagram of a computing device specially programmed to perform the functions described herein.

In one example, the access networks 122 may also be in communication with a server 116, e.g., a voice gateway. In accordance with the present disclosure, server 116 may comprise a computing system or server, such as computing system 300 depicted in FIG. 3, and may be configured to provide one or more operations or functions for submitting a modified voice input to a service based upon a user intent determined from a voice input in accordance with a voice interface of the service, as described herein. It should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 3 and discussed below) or multiple computing devices collectively configured to perform various steps, functions, and/or operations in accordance with the present disclosure.

In one example, DB 118 may comprise a physical storage device integrated with server 116 (e.g., a database server), or attached or coupled to the server 116, to store various types of information in support of systems for submitting a modified voice input to a service based upon a user intent determined from a voice input in accordance with a voice interface of the service. For example, DB 118 may store speech-to-text conversion models, natural language understanding (NLU) pipeline(s) (e.g., user-specific and/or non-user specific), online services' voice interface syntaxes, user preferences, user context information, and so forth that may be processed by server 116. DB 118 may also store programs, logic, or instructions that may be executed by server 116 for submitting a modified voice input to a service based upon a user intent determined from a voice input in accordance with a voice interface of the service, as described herein.

To illustrate, server 116 may obtain a voice input of user 171 via device 110 and/or headset 172 and determine an intent from the voice input. The determining of the intent may include converting the voice input to text, and applying a natural language understanding (NLU) pipeline to the text, where an output of the NLU model may comprise the intent. For example, the NLU pipeline may extract "entities" and "intents" from the text. The NLU pipeline may include various components or modules, such as an entity identification module (e.g., a named entity recognition (NER) module), an intent identification module, one or more preprocessing modules, e.g., a subject-verb-object (SVO) module (to identify subject, verb, and object(s) of a sentence), a domain-specific named entity dictionary, a synonym module (to identify similar words and/or word families), a feature extraction module, and so forth.

The entity identification module may provide entity extraction or "chunking" and may comprise a machine learning (ML)-based hidden Markov model (HMM), a maximum entropy (ME) model, a conditional random fields (CRF) sequence model, a deep learning model (e.g., a deep convolutional neural network), and so on. The entity identification model may be trained in a supervised or unsupervised manner (e.g., with annotated or unannotated data of one or more training data sets), and may include domain-specific entities, e.g., provided by an operator of the server 116. In one example, the entity identification model may also be personalized to user 171. For instance, user 171 may be enabled to provide lists of named entities and/or server 116 may learn over time some of the entities more frequently invoked by user 171. This information may be derived from past voice interactions of user 171 with the server 116, may be learned from text-based queries of online search engines, and so on.

Similarly, the intent identification module may comprise a machine learning (ML)-based classifier, such as a multi-class linear support vector machine (SVM), a neural network (e.g., a deep neural network (DNN)), and so forth. Both the entity identification model and the intent identification model may be trained in a supervised or unsupervised manner (e.g., with annotated or unannotated data of one or more training data sets), and may include domain-specific training data, e.g., provided by an operator of the server 116, or user-specific training data, e.g., provided by user 171 or learned by observation of voice interactions of user 171 with server 116 and/or non-voice search and other online interactions.

As referred to herein, a machine learning model (MLM) (or machine learning (ML)-based model) may comprise a machine learning algorithm (MLA) that has been "trained" or configured in accordance with input data (e.g., training data) to perform a particular service, e.g., to detect speech or other utterances in audio content, to identify words and phrases in speech and to convert to text, to identify intents and entities in natural language, and so forth. Examples of the present disclosure are not limited to any particular type of MLA/model, but are broadly applicable to various types of MLAs/models that utilize training data, such as support vector machines (SVMs), e.g., linear or non-linear binary classifiers, multi-class classifiers, deep learning algorithms/models, such as deep neural networks (DNNs), decision tree algorithms/models, k-nearest neighbor (KNN) clustering algorithms/models, hidden Markov models (HMMs), conditional random fields (CRF) models, and so forth.

After identifying intent(s) and entities, server 116 may then identify one or more services, from among a plurality of services, in accordance with the intent(s) (and extracted entity or entities). For instance, as mentioned above, services 150 may comprise various types of services as described herein, e.g., online services with voice interfaces (e.g., APIs with respective voice interface syntaxes), such as voice assistants, merchant or enterprise services (e.g., online retail shops, information services, etc.), and so on. It should be noted that voice assistant services may similarly comprise natural language processing (NLP) and/or natural language understanding (NLU) components. However, these voice assistant services may be particularized for specific tasks (e.g., shopping for a particular merchant, vehicular navigation, etc.), may be trained with different training data sets/corpuses, may have different voice interface syntaxes, and so forth. Similarly, voice assistant services or other services of services 150 may provide voice interfaces with command-based voice inputs, interactive voice response (IVR) based dialogs with yes/no questions, multiple choice options (e.g., 1-9), and so forth.

In one example, server 116 may maintain an intent-to-source mapping, or multiple intent-to-source mappings that are user-specific (e.g., a particular intent-to-source mapping for user 171). In one example, server 116 may learn intent-to-source mappings for user 171 (and others) over time and through various user interactions. Alternatively, or in addition, server 116 may apply a default intent-to-source mapping for one or more users, which may learn user-specific intent-to-source mappings over time, and/or which may be manually configured by respective users in accordance with their different preferences for intent-to-source mappings. For instance, one user may prefer weather information from a first source, news information from a second source, etc., while a second user may prefer weather information and news information from entirely different sources.

In addition, in one example, server 116 may select the one or more services in accordance with one or more user preferences. For instance, the user 171 may have a preference for a first merchant over a second merchant with regard to a particular category of products or services. Similarly, the user 171 may have a preference for a first information source over a second information source regarding one or more subjects. These preferences may be stored by DB 118 and retrieved by server 116 to further tailor the identification and selection of one or more services. It should be noted although user 171 may have a strong preference for a particular source, the intent of the user 171 may be determined to be related to a particular topic that is not relevant to the source. As such, server 116 may consider other sources for which user 171 has less of an affinity, but which may be more relevant to the intent. Similarly, the user 171 may have a preference for a merchant or information source. However, if the merchant does not appear to carry a product that is identified as part of the user intent or the information source does not have information on a topic identified in the intent, then non-preferred sources may be secondarily considered.

The server 116 may then formulate one or more modified voice inputs from the voice input, e.g., in accordance with the voice interface(s) of the one or more services. For example, each of the plurality of services 150 may be associated with one of a plurality of different voice interfaces, each with its own voice interface syntax. In one example, server 116 may prepend a wake-up word or phrase directed to a particular service in order to indicate that an actual voice input will follow. In an illustrative example, the voice input may comprise the user 171 asking "what is the weather going to be here this evening?" The server 116 may enhance this query by replacing the generic term "here" with a more specific location of user 171 (e.g., determined from Global Positioning System (GPS) location information, cellular base station and/or Wi-Fi hotspot tracking information, or the like for device 110 and/or headset 172). In still another example, user 171 may be shopping for clothes and may ask "are there any sales on shirts?" Server 116 may determine the intent is to find sales on shirts, and may enhance this voice input with the shirt size of user 171 (which user 171 may have provided in a user profile, or which user 171 may have specifically consented to be inferred from past purchases of user 171 and stored in a user profile to enhance the voice gateway service of server 116).

The server 116 may further submit the modified voice input(s) to the identified service(s) 150 and obtain response(s) from the service(s). In one example, server 116 may further process the response(s) before presenting a voice output to the user 171 via device 110 and/or headset 172. For instance, the processing may include speech-to-text conversion (e.g., for one or several voice responses), applying NLU pipeline(s) to the text(s), modifying (e.g., combining, comparing, etc. in accordance with the NLU output(s)), and then presenting the response(s), with possible modifications, as machine-generated voice output to the user 171. The modifications may include ordering the responses, selecting a "best" response according to one or more criteria (such as a preference of user 171 for a first service over a second service, a timeliness of the results from the respective services, a rating of a source associated with the results, etc.), averaging or synthesizing the results, comparing and contrasting results, and so on. It should be noted that server 116 may reconvert text to speech in order to generate the final presentation (e.g., a "voice output") for the user 171. These and other aspects of the present disclosure are discussed in greater detail below in connection with the example of FIG. 2.

Although only a single server 116 and a single DB 118 are illustrated, it should be noted that any number of servers 116 or databases 118 may be deployed. In addition, server 116, DB 118, any of services 150, and so forth may comprise public or private cloud computing resources, e.g., one or more host devices/servers in one or more data centers to host virtual machines (VMs), containers, or the like comprising various functions, services, and so on.

In one example, telecommunication network 102 may also include an application server (AS) 104 and a database (DB) 106. In one example, AS 104 may perform the same or similar functions as server 116. Similarly, DB 106 may store the same or similar information as DB 118 (e.g., speech-to-text conversion models, natural language understanding (NLU) pipeline(s), online services' voice interface syntaxes, user preferences, user context information, etc., programs, logic, or instructions that may be executed by AS 104 and/or server 116 for submitting a modified voice input to a service based upon a user intent determined from a voice input in accordance with a voice interface of the service, and so forth). For instance, telecommunication network 102 may provide a voice gateway service to subscribers, e.g., in addition to television, phone, and/or other telecommunication services. In one example, AS 104, DB 106, server 116, and/or DB 118 may operate in a distributed and/or coordinated manner to perform various steps, functions, and/or operations described herein. In one example, application server 104 may comprise a network function virtualization infrastructure (NFVI), e.g., one or more devices or servers that are available as host devices to host virtual machines (VMs), containers, or the like comprising virtual network functions (VNFs). In other words, at least a portion of the network 102 may incorporate software-defined network (SDN) components.

It should be noted that the system 100 has been simplified. Thus, the system 100 may be implemented in a different form than that which is illustrated in FIG. 1, or may be expanded by including additional endpoint devices, access networks, network elements, application servers, etc. without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements. For example, the system 100 may include other network elements (not shown) such as border elements, routers, switches, policy servers, security devices, gateways, a content distribution network (CDN) and the like. For example, portions of telecommunication network 102 and/or access networks 120 and 122 may comprise a content distribution network (CDN) having ingest servers, edge servers, and the like.

Similarly, although only two access networks 120 and 122 are shown, in other examples, access networks 120 and/or 122 may each comprise a plurality of different access networks that may interface with telecommunication network 102 independently or in a chained manner. For example, device 114 and server 116 may access telecommunication network 102 via different access networks, devices 110 and 112 may access telecommunication network 102 via different access networks, and so forth. Thus, these and other modifications are all contemplated within the scope of the present disclosure.

Figure 2:
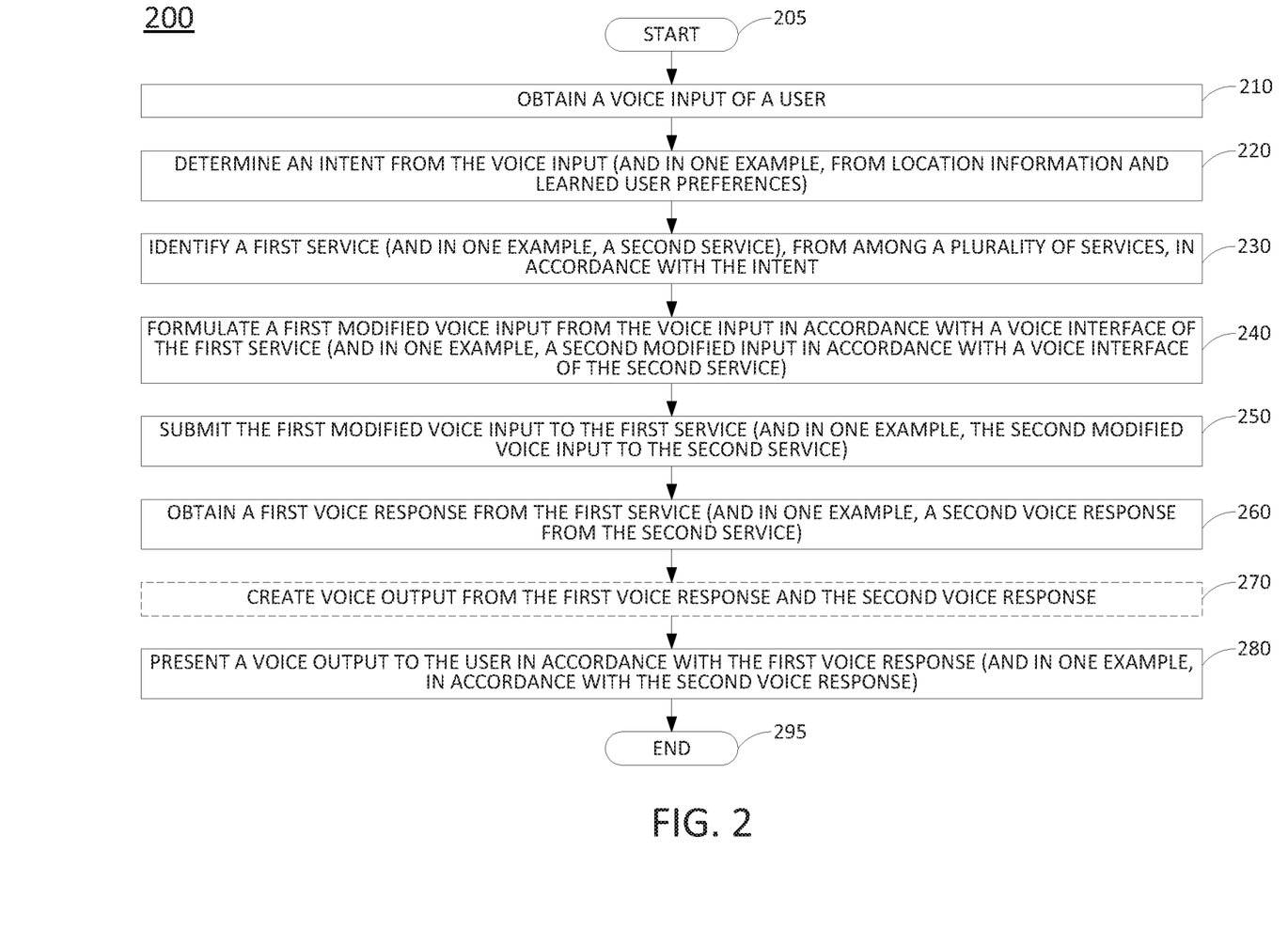
FIG. 2 illustrates a flowchart of an example method for submitting a modified voice input to a service based upon a user intent determined from a voice input in accordance with a voice interface of the service.

FIG. 2 illustrates a flowchart of an example method 200 for submitting a modified voice input to a service based upon a user intent determined from a voice input in accordance with a voice interface of the service. In one example, the method 200 is performed by a component of the system 100 of FIG. 1, such as by server 116, AS 104, device 110, and/or any one or more components thereof (e.g., a processor, or processors, performing operations stored in and loaded from a memory), or by server 116, AS 104, or device 110 in conjunction with one or more other devices, such as headset 172, services 150 (e.g., one or more servers), and so forth. In one example, the steps, functions, or operations of method 200 may be performed by a computing device or system 300, and/or processor 302 as described in connection with FIG. 3 below. For instance, the computing device or system 300 may represent any one or more components of server 116, AS 104, device 110, etc. in FIG. 1 that is/are configured to perform the steps, functions and/or operations of the method 200. Similarly, in one example, the steps, functions, or operations of method 200 may be performed by a processing system comprising one or more computing devices collectively configured to perform various steps, functions, and/or operations of the method 200. For instance, multiple instances of the computing device or processing system 300 may collectively function as a processing system. For illustrative purposes, the method 200 is described in greater detail below in connection with an example performed by a processing system.

The method 200 begins at step 205 and proceeds to step 210.

In step 210, the processing system obtains a voice input of a user. For instance, the voice input may be obtained from a mobile computing device of the user, such as a wired or wireless headset, a smartphone, a laptop computer, a tablet computer, etc. In one example, the processing system may comprise telecommunication network edge computing infrastructure. In another example, the processing system may comprise other network-based infrastructure e.g., non-edge cloud computing infrastructure of a telecommunication network service provider or "public cloud" computing infrastructure, e.g., VMs, containers, or the like instantiated on NFVI/host devices, and so forth. In still another example, the processing system may comprise the mobile computing device of the user.

In step 220, the processing system determines an intent from the voice input. For example, step 220 may include converting the voice input to text and applying a natural language understanding (NLU) pipeline to the text, where an output of the NLU pipeline comprises the intent. It should be noted that the NLU pipeline may output a plurality of intents and may further output one or more extracted entities. In one example, step 220 may also include obtaining user location information and/or learned user preferences, where the intent may be further determined in accordance with the location information and/or learned user preferences. For instance, the NLU pipeline may be personalized to the user in order to favor the user's preferences, or to more accurately infer intents based upon the user's preferences and/or the user's location.

In step 230, the processing system identifies a first service, from among a plurality of services, in accordance with the intent. In one example, step 230 further includes identifying at least a second service, from among the plurality of services, in accordance with the intent. In one example, the identifying of the first service and/or the second service is further in accordance with a user preference for the first service and/or the second service. In one example, the user preference for the first service and/or the second service is learned by the processing system in accordance with a plurality of interactions of the first user with the processing system. For instance, the first service may comprise a voice assistant service, an online merchant service (for purchasing goods, services, etc.), an online information service, e.g., dictionary, thesaurus, weather, traffic, navigation, or other types of information services), an online enterprise service (e.g., a corporate intranet, a conference bridge service, etc.), a telecommunications service, e.g., for composing, sending, or retrieving text messages, voice messages, etc., to place a voice call, to set-up conference call, etc., to configure aspects of television, voice, or data services to a customer premises, and so forth.

In step 240, the processing system formulates a first modified voice input from the voice input in accordance with a voice interface of the first service, wherein each of the plurality of services is associated with one of a plurality of different voice interfaces. In one example, step 240 further includes formulating a second modified voice input from the voice input in accordance with a voice interface of the second service. In one example, the plurality of different voice interfaces comprises a plurality of different voice application programming interfaces, e.g., each with a different syntax. In one example, the formulating of the first modified voice input and/or the second modified voice input may include modifying the voice input in accordance with user context information, such as location information of the user, an interest of the user, calendar information of the user, or biometric information of the user. In one example, step 240 may include adding a wake-up phrase in accordance with the voice interface of the first service.

In step 250, the processing system submits the first modified voice input to the first service. In one example, step 250 further includes submitting the second modified voice input to the second service. For instance, the first modified voice input may be packetized and transmitted to the first service over one or more networks, and similarly for the second modified voice input.

In step 260, the processing system obtains a first voice response from the first service. In one example, step 260 further includes obtaining a second voice response from the second service. The first voice response and second voice response may be received over one or more of the same or different networks as the modified voice input(s) are submitted at step 250.

In optional step 270, the processing system may create a voice output from the first voice response and the second voice response. For example, optional step 270 may include selecting an order of presentation among the first voice response and the second voice response or modifying the first voice response in accordance with the second voice response. For example, the user intent is to inquire about the forecast temperature later in the day, a first service may provide a prediction of 80 degrees, while a second service may provide a prediction of 84 degrees. Thus, the processing system may formulate a voice output to state that "one source predicts a temperature of 80 degrees while another source predicts a temperature of 84 degrees." In another example, the processing system may average these results to indicate to the user that "the predicted temperature is 82 degrees." It should be noted that optional step 270 may also include performing speech to text conversion (e.g., for one or both of the first voice response and the second voice response), applying NLU pipeline(s) to the text(s), modifying (e.g., combining, enhancing, etc.) the text(s) in accordance with the NLU output(s)), and re-converting from text to speech.

In step 280, the processing system presents a voice output to the user in accordance with the first voice response (and, in one example, in accordance with the second voice response). For instance, the voice output may be created in accordance with optional step 270. Alternatively, or in addition, step 280 may comprise presenting the first voice response and/or the second voice response in an unmodified format (as obtained from the first service and/or the second service at step 260).

Following step 280, the method 200 proceeds to step 295 where the method ends.

It should be noted that the method 200 may be expanded to include additional steps, or may be modified to replace steps with different steps, to combine steps, to omit steps, to perform steps in a different order, and so forth. For instance, in one example the processing system may repeat one or more steps of the method 200, such as steps 210-280 for additional voice inputs, for voice interactions, e.g., natural language dialogs with one or more services, and so forth. In another example, the processing system may update user preferences, intent-to-service mappings, and so forth based upon user inputs, or learned by observation of continuing user interactions with the processing system. Thus, these and other modifications are all contemplated within the scope of the present disclosure.

In addition, although not expressly specified above, one or more steps of the method 200 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 2 that recite a determining operation or involve a decision do not necessarily require that both branches of the determining operation be practiced. In other words, one of the branches of the determining operation can be deemed as an optional step. However, the use of the term "optional step" is intended to only reflect different variations of a particular illustrative embodiment and is not intended to indicate that steps not labelled as optional steps to be deemed to be essential steps. Furthermore, operations, steps or blocks of the above described method(s) can be combined, separated, and/or performed in a different order from that described above, without departing from the example embodiments of the present disclosure.

FIG. 3 depicts a high-level block diagram of a computing device or processing system specifically programmed to perform the functions described herein. For example, any one or more components or devices illustrated in FIG. 1 or described in connection with the method 200 may be implemented as the processing system 300. As depicted in FIG. 3, the processing system 300 comprises one or more hardware processor elements 302 (e.g., a microprocessor, a central processing unit (CPU) and the like), a memory 304, (e.g., random access memory (RAM), read only memory (ROM), a disk drive, an optical drive, a magnetic drive, and/or a Universal Serial Bus (USB) drive), a module 305 for submitting a modified voice input to a service based upon a user intent determined from a voice input in accordance with a voice interface of the service, and various input/output devices 306, e.g., a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

Although only one processor element is shown, it should be noted that the computing device may employ a plurality of processor elements. Furthermore, although only one computing device is shown in the Figure, if the method(s) as discussed above is implemented in a distributed or parallel manner for a particular illustrative example, i.e., the steps of the above method(s) or the entire method(s) are implemented across multiple or parallel computing devices, e.g., a processing system, then the computing device of this Figure is intended to represent each of those multiple computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 302 can also be configured or programmed to cause other devices to perform one or more operations as discussed above. In other words, the hardware processor 302 may serve the function of a central controller directing other devices to perform the one or more operations as discussed above.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computing device, or any other hardware equivalents, e.g., computer readable instructions pertaining to the method(s) discussed above can be used to configure a hardware processor to perform the steps, functions and/or operations of the above disclosed method(s). In one example, instructions and data for the present module or process 305 for submitting a modified voice input to a service based upon a user intent determined from a voice input in accordance with a voice interface of the service (e.g., a software program comprising computer-executable instructions) can be loaded into memory 304 and executed by hardware processor element 302 to implement the steps, functions or operations as discussed above in connection with the example method 300. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 305 for submitting a modified voice input to a service based upon a user intent determined from a voice input in accordance with a voice interface of the service (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not limitation. Thus, the breadth and scope of a preferred embodiment should not be limited by any of the above-described example embodiments, but should be defined only in accordance with the following claims and their equivalents.

What is claimed is:

1. A method comprising:
obtaining, by a processing system including at least one processor, a voice input of a user;
determining, by the processing system, an intent from the voice input;
identifying, by the processing system, a first service, from among a plurality of services, in accordance with the intent via an intent-to-service mapping, wherein the identifying further comprises identifying at least a second service, from among the plurality of services, in accordance with the intent;
formulating, by the processing system, a first modified voice input from the voice input in accordance with a voice interface of the first service, wherein each of the plurality of services is associated with one of a plurality of different voice interfaces, wherein the formulating further comprises formulating a second modified voice input from the voice input in accordance with a voice interface of the second service;
submitting, by the processing system, the first modified voice input to the first service, wherein the submitting further comprises submitting the second modified voice input to the second service;
obtaining, by the processing system, a first voice response from the first service, wherein the obtaining further comprises obtaining a second voice response from the second service;
creating, by the processing system, a voice output from the first voice response and the second voice response, wherein the creating the voice output from the first voice response and the second voice response comprises:
 selecting an order of presentation among the first voice response and the second voice response; or
 modifying the first voice response in accordance with the second voice response; and
presenting, by the processing system, the voice output to the user.

2. The method of claim 1, wherein the plurality of different voice interfaces comprises a plurality of different voice application programming interfaces.

3. The method of claim 1, wherein the voice input is obtained from a mobile computing device of the user.

4. The method of claim 1, wherein the processing system comprises a telecommunication network edge computing infrastructure.

5. The method of claim 1, wherein the formulating the first modified voice input further comprises:
modifying the voice input in accordance with user context information.

6. The method of claim 5, wherein the user context information comprises at least one of:
location information of the user;
an interest of the user;
calendar information of the user; or
biometric information of the user.

7. The method of claim 1, wherein the identifying is further in accordance with a user preference for the first service.

8. The method of claim 7, wherein the user preference for the first service is learned by the processing system in accordance with a plurality of interactions of the user with the processing system.

9. The method of claim 1, wherein the determining the intent from the voice input comprises:
converting the voice input to text; and
applying a natural language understanding pipeline to the text, wherein an output of the natural language understanding pipeline comprises the intent.

10. The method of claim 1, wherein the formulating the first modified voice input from the voice input comprise adding a wake-up phrase in accordance with the voice interface of the first service.

11. The method of claim 10, wherein the first service comprises a voice assistant service.

12. The method of claim 1, wherein the first service comprises:
an online merchant service;
an online information service;
an online enterprise service;
a telecommunications service; or
a voice assistant service.

13. A non-transitory computer-readable medium storing instructions which, when executed by a processing system including at least one processor, cause the processing system to perform operations, the operations comprising:
obtaining a voice input of a user;
determining an intent from the voice input;
identifying a first service, from among a plurality of services, in accordance with the intent via an intent-to-service mapping, wherein the identifying further comprises identifying at least a second service, from among the plurality of services, in accordance with the intent;
formulating a first modified voice input from the voice input in accordance with a voice interface of the first service, wherein each of the plurality of services is associated with one of a plurality of different voice interfaces, wherein the formulating further comprises formulating a second modified voice input from the voice input in accordance with a voice interface of the second service;
submitting the first modified voice input to the first service, wherein the submitting further comprises submitting the second modified voice input to the second service;
obtaining a first voice response from the first service, wherein the obtaining further comprises obtaining a second voice response from the second service;
creating a voice output from the first voice response and the second voice response, wherein the creating the voice output from the first voice response and the second voice response comprises:
 selecting an order of presentation among the first voice response and the second voice response; or
 modifying the first voice response in accordance with the second voice response; and
presenting the voice output to the user.

14. A device comprising:
a processing system including at least one processor; and
a non-transitory computer-readable medium storing instructions which, when executed by the processing system, cause the processing system to perform operations, the operations comprising:
 obtaining a voice input of a user;
 determining an intent from the voice input;
 identifying a first service, from among a plurality of services, in accordance with the intent via an intent-to-service mapping, wherein the identifying further comprises identifying at least a second service, from among the plurality of services, in accordance with the intent;

formulating a first modified voice input from the voice input in accordance with a voice interface of the first service, wherein each of the plurality of services is associated with one of a plurality of different voice interfaces, wherein the formulating further comprises formulating a second modified voice input from the voice input in accordance with a voice interface of the second service;

submitting the first modified voice input to the first service, wherein the submitting further comprises submitting the second modified voice input to the second service;

obtaining a first voice response from the first service, wherein the obtaining further comprises obtaining a second voice response from the second service;

creating a voice output from the first voice response and the second voice response, wherein the creating the voice output from the first voice response and the second voice response comprises:
  selecting an order of presentation among the first voice response and the second voice response; or
  modifying the first voice response in accordance with the second voice response; and presenting the voice output to the user.

15. The non-transitory computer-readable medium of claim 13, wherein the plurality of different voice interfaces comprises a plurality of different voice application programming interfaces.

16. The non-transitory computer-readable medium of claim 13, wherein the voice input is obtained from a mobile computing device of the user.

17. The non-transitory computer-readable medium of claim 13, wherein the processing system comprises a telecommunication network edge computing infrastructure.

18. The non-transitory computer-readable medium of claim 13, wherein the formulating the first modified voice input further comprises:
  modifying the voice input in accordance with user context information.

19. The non-transitory computer-readable medium of claim 18, wherein the user context information comprises at least one of:
  location information of the user;
  an interest of the user;
  calendar information of the user; or
  biometric information of the user.

20. The non-transitory computer-readable medium of claim 13, wherein the identifying is further in accordance with a user preference for the first service.

* * * * *